United States Patent
Choi et al.

(10) Patent No.: US 12,424,737 B2
(45) Date of Patent: Sep. 23, 2025

(54) ANTENNA-INSERTED ELECTRODE STRUCTURE AND IMAGE DISPLAY DEVICE INCLUDING THE SAME

(71) Applicant: DONGWOO FINE-CHEM CO., LTD., Jeollabuk-do (KR)

(72) Inventors: Byung Jin Choi, Incheon (KR); Dong Ok Kim, Gyeonggi-do (KR); Jae Hyun Lee, Gyeonggi-do (KR)

(73) Assignee: DONGWOO FINE-CHEM CO., LTD., Jeollabuk-do (KR)

( * ) Notice: Subject to any disclaimer, the term of this patent is extended or adjusted under 35 U.S.C. 154(b) by 232 days.

(21) Appl. No.: 18/098,333

(22) Filed: Jan. 18, 2023

(65) Prior Publication Data

US 2023/0163456 A1    May 25, 2023

Related U.S. Application Data

(63) Continuation of application No. PCT/KR2021/009377, filed on Jul. 21, 2021.

(30) Foreign Application Priority Data

Jul. 22, 2020    (KR) .................. 10-2020-0090944

(51) Int. Cl.
  *H01Q 1/52* (2006.01)
  *G06F 3/044* (2006.01)
  *H01Q 1/24* (2006.01)

(52) U.S. Cl.
  CPC ............ *H01Q 1/52* (2013.01); *G06F 3/0443* (2019.05); *G06F 3/0446* (2019.05); *H01Q 1/243* (2013.01)

(58) Field of Classification Search
  CPC ............ H01Q 1/243; H01Q 1/50; H01Q 1/38; H01Q 7/00; H01Q 1/2225; H01Q 1/2216;
  (Continued)

(56) References Cited

U.S. PATENT DOCUMENTS

2011/0273360 A1* 11/2011 Campero ............... H01Q 5/307
                                                               343/893
2013/0293354 A1* 11/2013 Vemagiri ................ H01F 38/14
                                                               235/492

(Continued)

FOREIGN PATENT DOCUMENTS

CN    111007952 A    4/2020
CN    111007953 A    4/2020
(Continued)

OTHER PUBLICATIONS

KR1020130009466—Touch Screen Panel With an Electro Static Discharge Function for Discharging Static Electricity Flowed From an External Author: Lee, Hyun Jae (Year: 2013).*

(Continued)

*Primary Examiner* — Wei (Victor) Y Chan
(74) *Attorney, Agent, or Firm* — The PL Law Group, PLLC (57) ABSTRACT

An antenna-inserted electrode structure according to an embodiment includes a substrate layer, an antenna unit disposed on the substrate layer and an electrostatic discharge line extending from a periphery of the antenna unit on the substrate layer. An external static electricity and a side current may be removed by the electrostatic discharge line to prevent electrical and mechanical damages of the antenna unit.

13 Claims, 8 Drawing Sheets

(58) Field of Classification Search
CPC ........ H01Q 1/48; H01Q 9/0421; H01Q 21/28; H01Q 1/44; H01Q 9/42; H01Q 1/22
See application file for complete search history.

(56) References Cited

U.S. PATENT DOCUMENTS

| | | |
|---|---|---|
| 2014/0232691 A1 | 8/2014 | Lee |
| 2015/0351207 A1 | 12/2015 | Tung et al. |
| 2016/0365620 A1 | 12/2016 | Que et al. |
| 2017/0244153 A1* | 8/2017 | Chen .................. H01Q 13/10 |

FOREIGN PATENT DOCUMENTS

| | | |
|---|---|---|
| CN | 215896705 U | 2/2022 |
| KR | 10-2012-0063652 A | 6/2012 |
| KR | 10-2013-0009466 A | 1/2013 |
| KR | 10-2013-0095451 A | 8/2013 |
| KR | 10-2014-0100822 A | 8/2014 |
| KR | 10-2015-0126207 A | 11/2015 |
| KR | 10-2018-0057250 A | 5/2018 |
| KR | 10-2020-0013183 A | 2/2020 |
| KR | 10-2020-0071354 A | 6/2020 |
| WO | WO 2013/063176 A1 | 5/2013 |

OTHER PUBLICATIONS

KR1020140100822—Touch Screen Panel Having Antenna Pattern and Display Device Having Same Author: Lee, Hyun Jae (Year: 2014).*
KR1020130009466—Touch Screen Panel Having Antenna Pattern and Display Device Having Same Author: Lee, Hyun Jae Translation (Year: 2013).*
KR1020140100822'Touch Screen Panel Having Antenna Pattern and Display Device Having Same Author: Lee, Hyun Jae Translation (Year: 2014).*
Office action issued on Dec. 19, 2024 from China Patent Office in a counterpart China Patent Application No. 202110828456.7 (English translation is also submitted herewith.).
International Search Report for PCT/KR2021/009377 mailed on Oct. 26, 2021.
Office action issued on Nov. 28, 2021 from Korean Patent Office in a counterpart Korean Patent Application No. 10-2020-0090944. (English translation is also submitted herewith.).

* cited by examiner

ANTENNA-INSERTED ELECTRODE STRUCTURE AND IMAGE DISPLAY DEVICE INCLUDING THE SAME

CROSS-REFERENCE TO RELATED APPLICATION AND CLAIM OF PRIORITY

The present application is a continuation application to International Application No. PCT/KR2021/009377 with an International Filing Date of Jul. 21, 2021., which claims the benefit of Korean Patent Application No. 10-2020-0090944 filed on Jul. 22, 2020 at the Korean Intellectual Property Office, the disclosures of which are incorporated by reference herein in their entirety.

BACKGROUND

1. Field

The present invention relates to an antenna-inserted electrode structure and a display device including the same. More particularly, the present invention relates to an antenna-inserted electrode structure including an antenna unit and a sensing electrode and an image display device including the same.

2. Description of the Related Art

Recently, electronic devices capable of inputting a user's direction by selecting an instruction displayed on an image display device with a human hand or an object are implemented by a combination of the image display device and a touch sensor as various shapes such as a smart phones, a tablet PC, etc.

Further, the image display device is being combined with a communication device such as a smart phone. For example, an antenna for implementing high-frequency or ultra-high frequency communication may be applied to the image display device.

In the touch sensor, the large number of sensing electrodes are arranged in a display area of the image display device. Further, a thin film transistor (TFT) circuit and various wirings are also distributed on a display panel included in the image display device. When a strong voltage or current is applied from an outside of the image display device, the sensing electrodes, circuits and wirings may be damaged or a short circuit may occur. An antenna electrode may also be damaged by an external voltage or current.

Further, when an electrostatic discharge (ESD) test by applying a predetermined current to the image display device is performed for a product reliability of the touch sensor, the antenna electrode may be damaged by the applied current. Recently, a size of the antenna electrode has been decreased for implementing a communication in the high frequency or ultra-high frequency band, and thus even a small ESD current may cause damages to the antenna electrode, a short circuit, a signal disturbance, etc.

For example, as disclosed in Korean Published Patent Application No. 2014-0092366, a touch screen panel in which a touch sensor is combined with various image display devices has been recently developed. Korean Patent Publication No. 2013-0095451 discloses an antenna integrated into a display panel.

SUMMARY

According to an aspect of the present invention, there is provided an antenna-integrated electrode structure having improved electrical and mechanical reliability.

According to an aspect of the present invention, there is provided an image display device including an antenna-integrated electrode structure with improved electrical and mechanical reliability.

The above aspects of the present invention will be achieved by one or more of the following features or constructions:

(1) An antenna-inserted electrode structure, including: a substrate layer; an antenna unit disposed on the substrate layer; and an electrostatic discharge line extending from a periphery of the antenna unit on the substrate layer.

(2) The antenna-inserted electrode structure of the above (1), wherein the antenna unit includes a plurality of antenna units spaced apart from each other on the substrate layer, and the electrostatic discharge line includes a plurality of electrostatic discharge lines extending from peripheries of outermost antenna units of the plurality of antenna units.

(3) The antenna-inserted electrode structure of the above (2), further including an electrostatic discharge pattern disposed between antenna units neighboring each other of the plurality of antenna units.

(4) The antenna-inserted electrode structure of the above (3), further including an electrostatic discharge bridge electrically connecting the electrostatic discharge pattern and the electrostatic discharge line.

(5) The antenna-inserted electrode structure of the above (2), further including an electrostatic discharge bridge electrically connecting the plurality of electrostatic discharge lines.

(6) The antenna-inserted electrode structure of the above (5), wherein the electrostatic discharge bridge extends to avoid the plurality of antenna units in a planar view.

(7) The antenna-inserted electrode structure of the above (5), wherein the electrostatic discharge bridge extends across the plurality of antenna units in a planar view.

(8) The antenna-inserted electrode structure of the above (5), further including: an insulating layer covering the plurality antenna units on the substrate layer; and electrostatic discharge contacts formed through the insulating layer to connect the plurality of electrostatic discharge lines and the electrostatic discharge bridge to each other.

(9) The antenna-inserted electrode structure of the above (8), wherein the electrostatic discharge bridge includes a first electrostatic discharge bridge disposed on the insulating layer, and a second electrostatic discharge bridge disposed under the substrate layer, wherein the electrostatic discharge contacts include a first electrostatic discharge contact penetrating the insulating layer to be connected to the first electrostatic discharge bridge, and a second electrostatic discharge contact penetrating the substrate layer to be connected to the second electrostatic discharge bridge.

(10) The antenna-inserted electrode structure of the above (1), further including sensing electrodes arranged on the substrate layer, wherein the substrate layer has an active region in which the sensing electrodes are arranged, and a peripheral region at an outside the active region.

(11) The antenna-inserted electrode structure of the above (10), wherein the electrostatic discharge line extends on the peripheral region along a perimeter of the active region.

(12) The antenna-inserted electrode structure of the above (11), further including a guard line extending on the peripheral region of the substrate layer.

(13) The antenna-inserted electrode structure of the above (12), wherein the guard line is electrically separated from the electrostatic discharge line and is closer to the active region than the electrostatic discharge line.

(14) The antenna-inserted electrode structure of the above (13), further including: traces branching from the sensing electrodes and extending on the peripheral region; a sensing pad row including sensing pads connected to end portions of the traces; and an electrostatic discharge pad connected to an end portion of the electrostatic discharge line; and a guard pad connected to an end portion of the guard line.

(15) The antenna-inserted electrode structure of the above (14), wherein the guard pad is disposed between the sensing pad row and the electrostatic discharge pad.

(16) An image display device including the antenna-inserted electrode structure according to embodiments as described above.

In an antenna-inserted electrode structure according to exemplary embodiments of the present invention, an electrostatic discharge (ESD) line may be formed to be adjacent to the antenna unit around an active region in which sensing electrodes of the touch sensor are arranged. Accordingly, a current applied during an electrostatic discharge (ESD) test may be discharged through the ESD line, and damages and short-circuit of the antenna unit caused by the current may be prevented.

In some embodiments, a touch sensor guard line may be further formed around the active region. Thus, radiation disturbance and electric field interference of the antenna unit caused by a current or a capacitance generated from the touch sensor may be further blocked.

In some embodiments, an ESD pattern may be added between the antenna units or an ESD bridge connecting the ESD line may be added. Accordingly, discharging of a static electricity and an external current around the antenna unit may be more effectively implemented.

DETAILED DESCRIPTION

According to exemplary embodiments of the present invention, there is provided an antenna-inserted electrode structure including an antenna unit, a sensing electrode and an electrostatic discharge line. Further, there is provided an image display device including the antenna-inserted electrode structure.

Hereinafter, the present invention will be described in detail with reference to the accompanying drawings. However, those skilled in the art will appreciate that such embodiments described with reference to the accompanying drawings are provided to further understand the spirit of the present invention and do not limit subject matters to be protected as disclosed in the detailed description and appended claims.

The terms "column direction" and "row direction" used herein do not refer to an absolute direction, but are used to relatively refer to two different directions.

Figure 1:
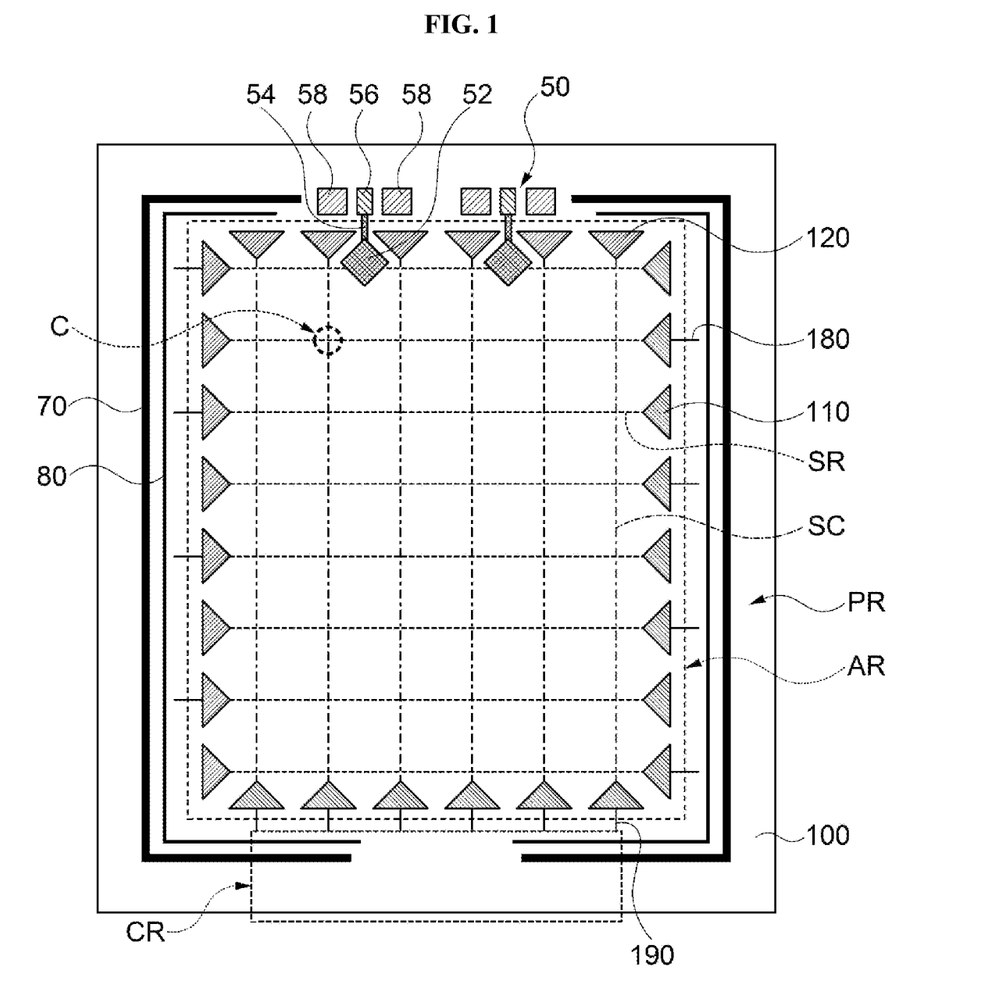
FIG. 1 is a schematic top planar view illustrating an antenna-inserted electrode structure in accordance with exemplary embodiments.
Figure 2:
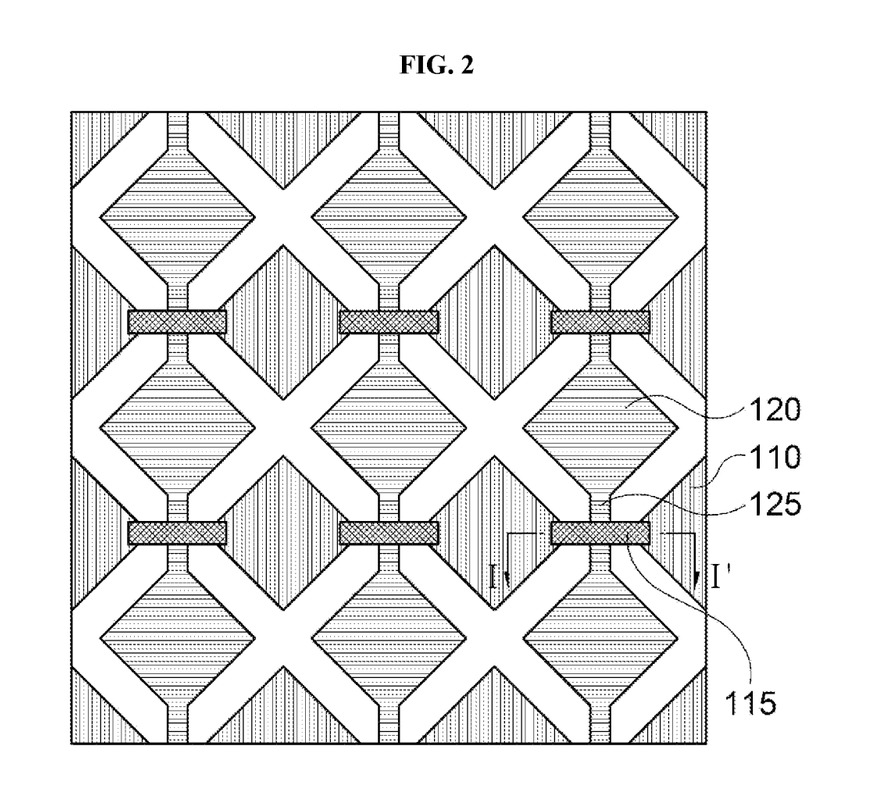
FIGS. 2 and 3 are a schematic top planar view and a schematic cross-sectional view, respectively, illustrating a construction of sensing electrodes in an antenna-inserted electrode structure in accordance with exemplary embodiments.
Figure 3:
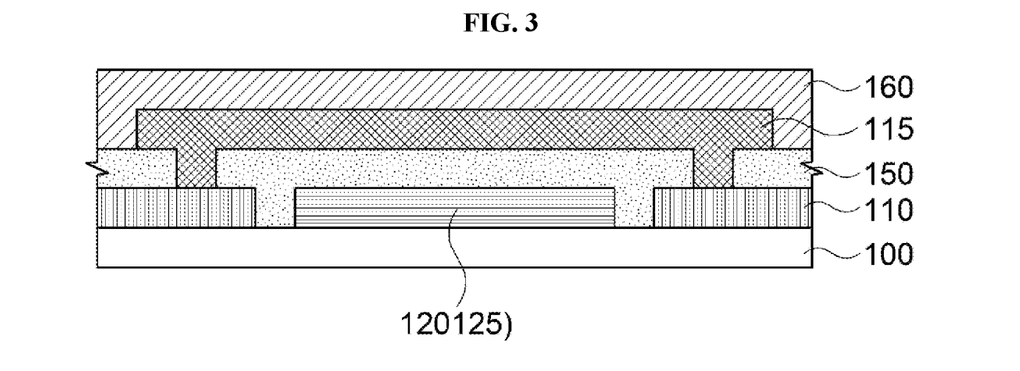

FIG. 1 is a schematic top planar view illustrating an antenna-inserted electrode structure in accordance with exemplary embodiments. FIGS. 2 and 3 are a schematic top planar view and a schematic cross-sectional view, respectively, illustrating a construction of sensing electrodes in an antenna-inserted electrode structure in accordance with exemplary embodiments.

Specifically, FIG. 2 is a partially enlarged top planar view illustrating an arrangement of sensing electrodes in an active region AR. FIG. 3 is a cross-sectional view taken along a line I-I' of FIG. 2 in a thickness direction. For example, FIG. 3 is a cross-sectional view at an intersection region C of a sensing electrode row and a sensing electrode column indicated in FIG. 1.

Referring to FIGS. 1 to 3, an antenna-inserted electrode structure may include a substrate layer 100 on which a sensing electrode and an antenna pattern are arranged.

The substrate layer 100 or the antenna-inserted electrode structure may include an active region AR and a peripheral region PR.

The active region AR may include a central portion of the substrate layer 100 and may substantially serve as an area of a touch sensor through which a user's touch input is substantially sensed. In exemplary embodiments, the active region AR may substantially correspond to a display area of an image display device.

In some embodiments, an antenna radiation may be performed through the active region AR. As illustrated in FIG. 1, the antenna unit 50 may be disposed on one lateral portion or one end portion of the active region AR. For example, the antenna unit 50 for implementing a high-frequency or ultra-high frequency communication (e.g., 3G, 4G, 5G communication or more) may be disposed at the one lateral portion or the one end portion of the active region AR together with sensing electrodes 110 and 120.

The peripheral region PR may include a peripheral portion of an upper surface of the substrate layer 100. The peripheral region PR may be defined along a periphery of the active region AR.

The substrate layer 100 may include a support layer or a film type substrate for forming the sensing electrodes and the antenna unit. For example, the substrate layer 100 may include a film material commonly used for a touch sensor without particular limitation, and may include, e.g., glass, a polymer, and/or an inorganic insulating material.

Examples of the polymer may include cyclic olefin polymer (COP), polyethylene terephthalate (PET), polyacrylate (PAR), polyetherimide (PEI), polyethylene naphthalate (PEN), polyphenylene sulfide (PPS), polyallylate, polyimide (PI), cellulose acetate propionate (CAP), polyethersulfone (PES), cellulose triacetate (TAC), polycarbonate (PC), cyclic olefin copolymer (COC), poly methyl methacrylate (PMMA), etc. Examples of the inorganic insulating material may include silicon oxide, silicon nitride, silicon oxynitride, a metal oxide, etc.

In some embodiments, a layer or film member of an image display device to which the antenna-inserted electrode structure is applied may serve as the substrate layer 100. For example, an encapsulation layer or a passivation layer included in a display panel may serve as the substrate layer 100.

The sensing electrodes may be arranged to be operable in a mutual capacitance type. The sensing electrodes may include first sensing electrodes 110 and second sensing electrodes 120.

The first sensing electrodes 110 may be arranged along a row direction, and may each have an independent island pattern shape. The first sensing electrodes 110 neighboring each other along the row direction may be electrically connected to each other via the bridge electrode 115.

Accordingly, the first sensing electrodes 110 arranged in the row direction may be connected to form a sensing electrode row extending in the row direction, and a plurality of the sensing electrode rows may be arranged along a column direction.

The second sensing electrodes 120 may be arranged along the column direction. The second sensing electrodes 120 may be connected to each other by a connector 125. The second sensing electrodes 120 and the connector 125 may be integrally connected to each other and may be provided as a substantially single member.

For example, the second sensing electrodes 120 may be connected to each other by the connector 125, so that a sensing electrode column extending in the column direction may be defined. A plurality of the sensing electrode columns may be arranged along the row direction.

In exemplary embodiments, the sensing electrodes 110 and 120 may include a transparent conductive oxide such as indium tin oxide (ITO), indium zinc oxide (IZO), zinc oxide (ZnO), indium zinc tin oxide (IZTO), cadmium tin oxide (CTO), etc. Accordingly, a decrease in transmittance in the active region AR may be suppressed.

In some embodiments, the sensing electrodes 110 and 120 may include silver (Ag), gold (Au), copper (Cu), aluminum (Al), platinum (Pt), palladium (Pd), chromium (Cr), titanium (Ti), tungsten (W), niobium (Nb), tantalum (Ta), vanadium (V), iron (Fe), manganese (Mn), cobalt (Co), nickel (Ni), zinc (Zn), molybdenum (Mo), tin (Sn), calcium (Ca) or an alloy containing at least one of the metals (e.g., silver-palladium-copper (APC)), or copper (Cu) or a copper alloy (e.g., a copper-calcium (CuCa)). These may be used alone or in combination thereof. In this case, the sensing electrodes 110 and 120 may be formed of a mesh structure for improving transmittance.

In an embodiment, the sensing electrodes 110 and 120 may have a multi-layered structure including a metal. For example, the sensing electrodes 110 and 120 may include a multi-layered structure of a transparent conductive oxide layer-metal layer or a multi-layered structure of a first transparent conductive oxide layer-metal layer-second transparent conductive oxide layer.

In this case, flexible properties may be improved by the metal layer, and a resistance may also be reduced by the metal layer to increase a signal transmission speed. Anti-corrosive and transparent properties may be improved by the transparent conductive oxide layer.

A row trace 180 and a column trace 190 may extend from terminal end portions of the above-described sensing electrode row and sensing electrode column, respectively. The traces 180 and 190 may extend on the peripheral region PR to a touch sensor circuit connection region CR (hereinafter, also abbreviated as a circuit connection region) allocated on an opposite end portion of the substrate layer 100.

For example, terminal end portions of the traces 180 and 190 may be assembled on the circuit connection region CR to be electrically connected to a touch sensor driving IC chip (not illustrated). For convenience of description, for example, illustration of detailed extension shapes of the traces 180 and 190 and arrangement/connection structures in the circuit connection region CR are omitted in FIG. 1.

The traces 180 and 190 may include the metal or alloy as described above.

The antenna unit 50 may include a radiator 52 and a transmission line 54. The radiator 52 may have, e.g., a polygonal pattern shape such as a rhombus shape. The transmission line 54 may extend from one end of the radiator 52. In some embodiments, the radiator 52 and the transmission line 54 may be a single member substantially integrally connected to each other.

The antenna unit 50 may further include an antenna pad. For example, a signal pad 56 may be connected to an end portion of the transmission line 54. A ground pad 58 may be disposed around the signal pad 56. For example, a pair of the ground pads 58 may be disposed to face each other with the signal pad 56 interposed therebetween. The ground pad 58 may be electrically and physically separated from the transmission line 54 and the signal pad 56.

In an embodiment, as illustrated in FIG. 1, a plurality of the antenna units 50 may be arranged in an array form at one end portion of the substrate layer 100 along the row direction. In an embodiment, a plurality of the antenna units 50 may be arranged in an array form along the column direction at one lateral portion of the substrate layer 100.

The antenna unit 50 may include a low-resistance metal or alloy to obtain a sufficient gain and radiation in a high frequency or ultra-high frequency band.

For example, the antenna unit 50 may include silver (Ag), gold (Au), copper (Cu), aluminum (Al), platinum (Pt), palladium (Pd), chromium (Cr), titanium (Ti), tungsten (W), niobium (Nb), tantalum (Ta), vanadium (V), iron (Fe), manganese (Mn), cobalt (Co), nickel (Ni), zinc (Zn), molybdenum (Mo), tin (Sn), calcium (Ca) or an alloy containing at least one of the metals. These may be used alone or in combination thereof.

In an embodiment, the antenna unit 50 may include silver or a silver-containing alloy (e.g., silver-palladium-copper (APC)), or a copper or a copper-containing alloy (e.g., copper-calcium (CuCa)) to implement a low resistance and a fine line width.

In an embodiment, the antenna unit 50 may have a multi-layered structure including a metal layer. For example, the antenna unit 50 may have a multi-layered structure of a transparent conductive oxide layer—the metal layer, or a multi-layered structure of a first transparent conductive oxide layer—the metal layer—a second transparent conductive oxide layer.

As illustrated in FIG. 1, the radiator 52 may be disposed in the active region AR. At least a portion of the transmission line 54 may also be disposed in the active region AR together with the radiator 52. In this case, the radiator 52 and the transmission line 54 may be formed as a mesh structure to prevent the antenna unit 50 from being viewed on the display area.

The signal pad 56 and the ground pad 58 may be disposed on the peripheral region PR. For example, the one end of the substrate layer 100 on which the signal pad 56 and the ground pad 58 are disposed may serve as an antenna bonding region for implementing an electrical connection between an antenna driving integrated circuit (IC) chip (not illustrated) and the antenna unit 50.

For example, a conductive bonding structure such as an anisotropic conductive film (ACF) may be attached on the signal pad 56 and the ground pad 58, and the signal pad 56 and a flexible printed circuit board (FPCB) may be electrically connected or bonded to each other via the conductive bonding structure.

The antenna driving IC chip may be mounted on the flexible printed circuit board. In an embodiment, a rigid printed circuit board may be disposed between the flexible printed circuit board and the antenna driving IC chip. In an embodiment, the antenna driving IC chip may be directly mounted on the flexible printed circuit board.

The signal pad 56 and the ground pad 58 may be formed as a solid pattern including the low-resistance metal or alloy as described above for reducing a circuit connection resistance. In an embodiment, at least a portion of the transmission line 54 may also have a solid structure.

In exemplary embodiments, an electrostatic discharge (ESD) line 70 may be formed on the peripheral region PR of the substrate layer 100 to be adjacent to the antenna unit 50. For example, the ESD line 70 may be adjacent to the pad of the antenna unit 50 (e.g., the ground pad 58), and may be physically spaced apart from the antenna unit 50 by a predetermined distance.

The ESD line 70 may extend along a circumference of the active region AR on the peripheral region PR. For example, the ESD line 70 may be bent from the one end portion of the substrate layer 100 on which the antenna unit 50 is disposed, and may extend to an opposite end portion of the substrate layer 100 via the lateral portion of the substrate layer 100.

In some embodiments, a guard line 80 may be formed on the peripheral region PR along the periphery of the active region AR. The guard line 80 may be disposed to be closer to the active region AR than the ESD line 70.

The guard line 80 may serve as a barrier line with respect to a touch sensing signal and a current generated in the active region AR. Accordingly, an external current and a mutual interference with circuits included in the display panel, and a noise transmission may be blocked, and touch sensing reliability in the active region AR may be improved.

According to exemplary embodiments of the present invention as described above, the electrostatic discharge (ESD) line may be formed to be adjacent to the antenna unit 50 around the active region AR in which the sensing electrodes 110 and 120 of the touch sensor are arranged. Accordingly, a current applied during an electrostatic discharge (ESD) test for confirming a reliability of the touch sensor or a side current by a static electricity input from an outside may be discharged through the ESD line to prevent damages and short-circuit of the antenna unit 50.

For example, as a frequency band of the antenna unit 50 is shifted to a high frequency or ultra-high frequency band, signal loss may become greater and a radiation property may be easily disturbed by an external current. In exemplary embodiments, the ESD line 70 being adjacent to the pad of the antenna unit 50 and continuously extending along the peripheral region AR may be disposed so that the static electricity may be efficiently discharged to the outside of the antenna insertion-electrode structure.

Additionally, the guard line 80 may be added between the sensing electrodes 110 and 120 and the ESD line 70, so that the touch sensing in the active region AR may be prevented from being disturbed by the discharged static electricity.

In some embodiments, the ESD line 70 may be electrically connected to a ground wiring of an IC chip (e.g., a touch sensor driving IC chip) through a flexible printed circuit board (FPCB). The ground wiring may be electrically connected to a ground circuit of an electronic device (e.g., a smart phone). Accordingly, the discharge of noise/static electricity through the ESD line 70 may be further promoted.

As illustrated in FIG. 3, an insulating layer 150 commonly covering the antenna unit 50, the sensing electrodes 110 and 120, the ESD line 70 and the guard line 80 may be formed on the upper surface of the substrate layer 100. The bridge electrode 115 may be formed on the insulating layer 150. The bridge electrode 115 may be formed through the insulating layer 150 to electrically connect the first sensing electrodes 110 neighboring each other.

A protective layer 160 may be formed on the insulating layer 150 to cover the bridge electrode 115. The insulating layer 150 and the protective layer 160 may include an inorganic insulating material such as silicon oxide or silicon nitride, or an organic insulating material such as an acrylic resin or a siloxane-based resin.

Figure 4:
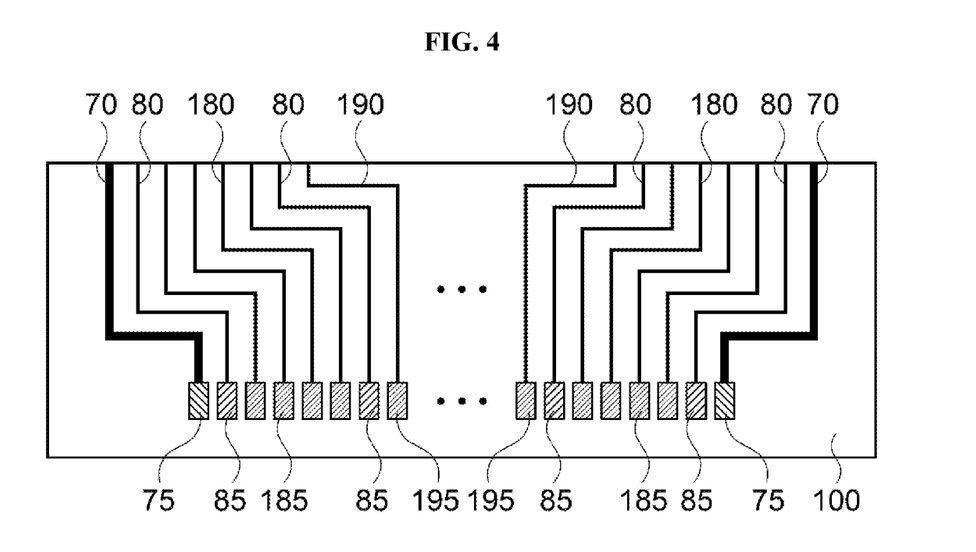
FIG. 4 is a partially enlarged top planar view illustrating a pad connection region in an antenna-inserted electrode structure in accordance with exemplary embodiments.

FIG. 4 is a partially enlarged top planar view illustrating a pad connection region in an antenna-inserted electrode structure in accordance with exemplary embodiments. For example, FIG. 4 schematically illustrates a wiring/pad structure in the circuit connection region CR indicated in FIG. 1.

Referring to FIG. 4, end portions of the ESD line 70, the guard line 80, the row traces 180 and the column traces 190 may be assembled on the circuit connection region CR. An ESD pad 75 may be connected to the end portion of the ESD line 70. A guard pad 85 may be connected to the end portion of the guard line 80. A first sensing pad 185 and a second sensing pad 195 may be connected to the end portions of the row traces 180 and the column traces 190, respectively.

A conductive bonding structure such as an anisotropic conductive film may be attached on the pads and may be bonded to the FPCB. The first sensing pads 185 and the second sensing pads 195 may be electrically connected to the touch sensor driving IC chip via the FPCB.

In some embodiments, the ESD pad 75 and the guard pad 85 may be connected to a ground layer or a ground pad of the FPCB to promote a discharge of static electricity and noise.

In exemplary embodiments, a pad row including the above-described pads may be disposed on the circuit connection region CR, and the ESD pads 75 may be disposed at both sides or both ends of the pad row, respectively.

In some embodiments, the guard pad 85 may be disposed between the ESD pad 75 and a sensing pad row including the sensing pads 185 and 195. For example, the guard pad 85 may be disposed between the ESD pad 75 and the first sensing pad 185 neighboring each other. Accordingly, transmission of electrical interference from the ESD pad 75 to the first sensing pad 185 may be blocked by the guard pad 85.

Further, the static electricity transferred from side or edge portions of the touch sensor or the antenna-inserted electrode structure, a bezel portion of an image display device, etc., may be absorbed by the ESD pad 75, and then additionally absorbed by the guard pad 85. Accordingly, an amount of the static electricity transferred to the sensing pads 185 and 195 may be efficiently reduced.

The guard pad 85 may also be disposed between the first sensing pad 185 and the second sensing pad 195 neighboring each other, thereby enhancing operational independence between the sensing electrode row and the sensing electrode column.

A touch sensing reliability may be improved by the above-described pad arrangement in the pad row while increasing the static discharge/noise absorption efficiency. Additionally, the ESD pad 75 and the ESD line 70 may be connected to implement a static electricity blocking effect in a substantially entire area of the device including the antenna-inserted electrode structure.

FIGS. 5 to 8 are schematic top planar views illustrating antenna-inserted electrode structures in accordance with some exemplary embodiments. Detailed descriptions on structures and elements substantially the same as or similar to those described with reference to FIGS. 1 to 4 are omitted herein.

Figure 5:
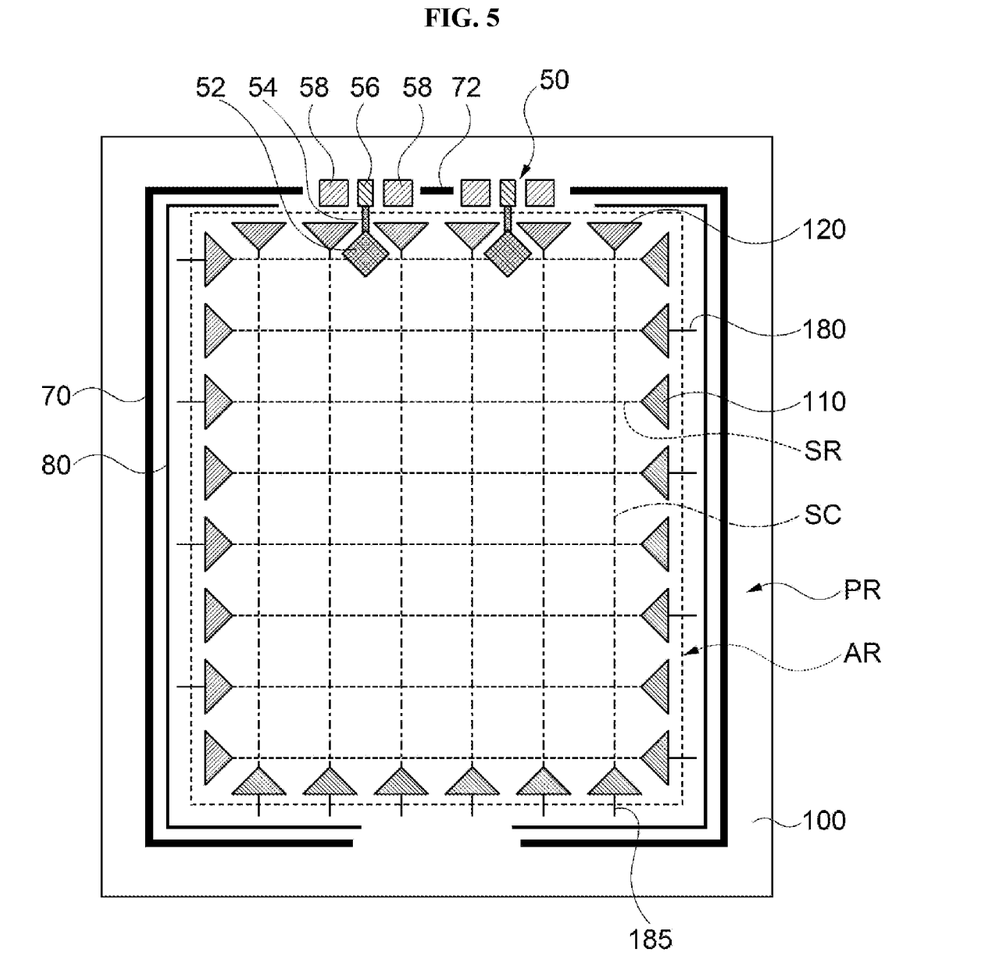
FIGS. 5 to 8 are schematic top planar views illustrating antenna-inserted electrode structures in accordance with some exemplary embodiments.

Referring to FIG. 5, an ESD pattern 72 may be added. For example, the ESD pattern 72 may be disposed between end portions of the adjacent ESD lines 70.

In some embodiments, the ESD pattern 72 may be disposed between the antenna units 50 neighboring each other. For example, the ESD pattern 72 may be disposed between the ground pads 58 included in different neighboring antenna units 50.

A static electricity may be discharged from the peripheral region PR through the ESD line 70, and the ESD pattern 72 may also block the static electricity in a space between the antenna units 50. Thus, radiation reliability of each antenna unit 50 may be improved while protecting the antenna units 50 more efficiently.

As illustrated in FIG. 5, the ESD pattern 72 may have a bar shape, and may be formed in various shapes such as a wavy pattern, a bent bar pattern, etc.

Figure 6:
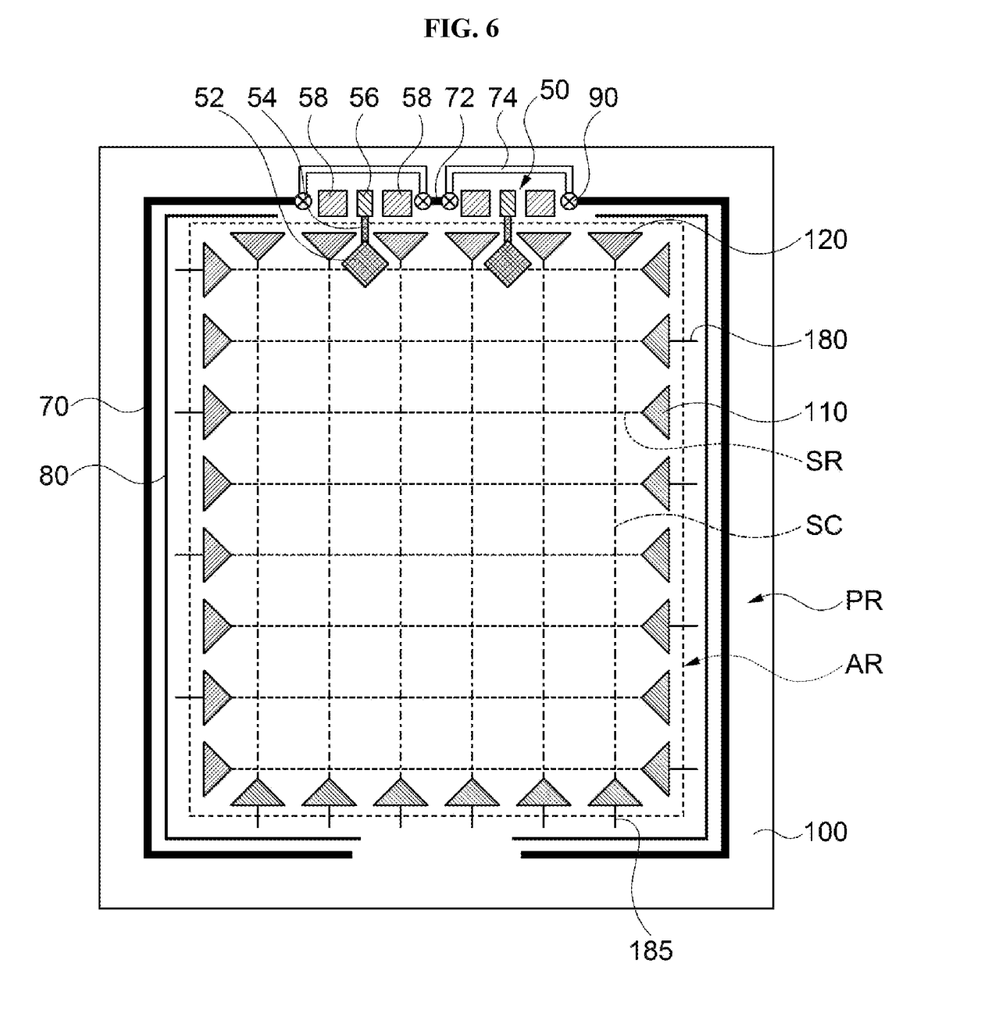

Referring to FIG. 6, an ESD bridge 74 connecting the ESD line 70 and the ESD pattern 72 to each other may be added. For example, the ESD bridge 74 may formed on the insulating layer 150 (see FIG. 3) to electrically connect the ESD line 70 and the ESD pattern 72 neighboring each other via an ESD contact 90.

In some embodiments, the ESD line 70 and the ESD pattern 72 adjacent to each other with the antenna unit 50 interposed therebetween may be connected to each other via the ESD contact 90.

An ESD structure including the ESD line 70, the ESD pattern 72 and the ESD bridge 74 may be formed around the antenna bonding region, so that a continuity of static electricity discharge may be enhanced to electrically protect the antenna unit 50 more effectively.

As illustrated in FIG. 6, the ESD bridge 74 may extend to avoid the antenna unit 50 (or the signal pad 56) or not to overlap the antenna unit 50 in a planar view. Accordingly, radiation interference and signal transmission interference in the antenna unit 50 may be suppressed.

In an embodiment, the ESD bridge 74 may extend to cross the antenna unit 50 in the planar view.

Figure 7:
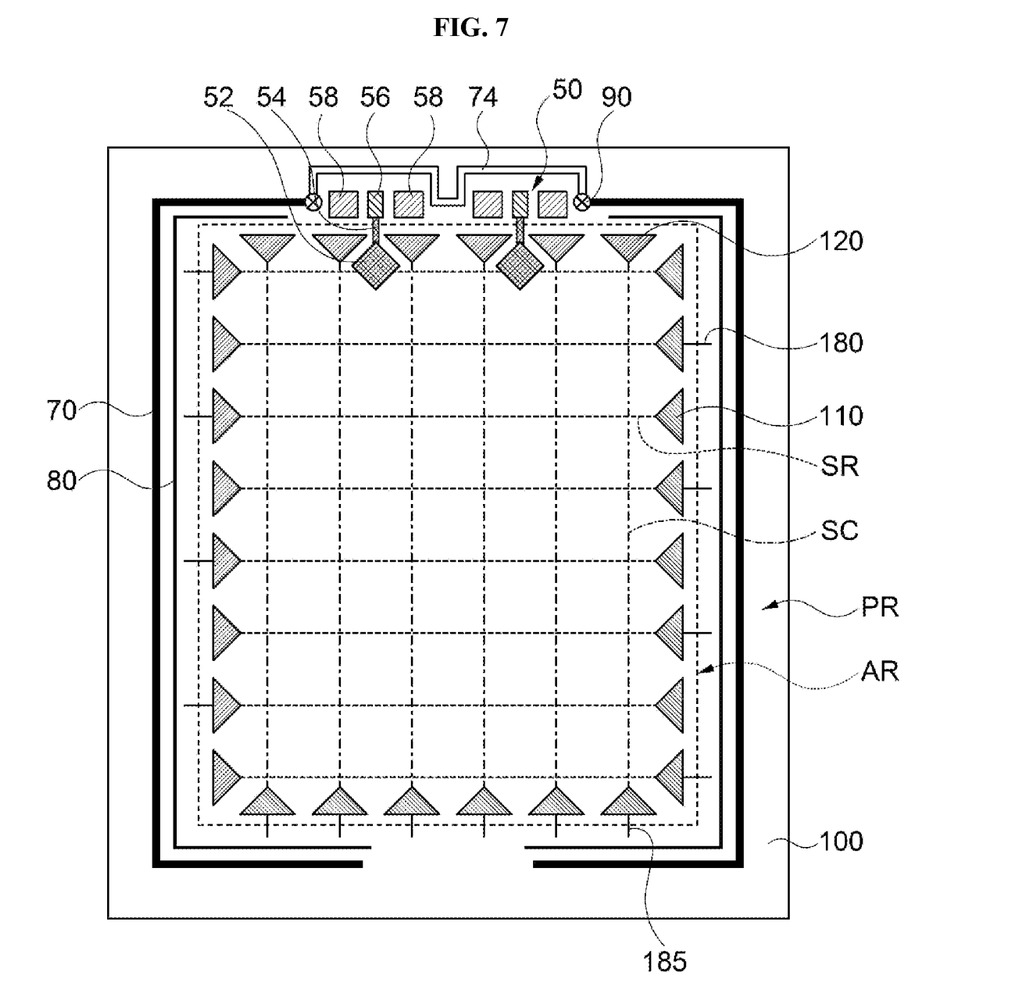

Referring to FIG. 7, for example, the ESD pattern 72 of FIGS. 5 and 6 formed at the same level or at the same layer as that of the antenna unit 50 and the ESD line 70 may be omitted, and the ESD bridge 74 may be formed such that end portions of the neighboring ESD lines 70 may be electrically connected to each other.

As described above, the ESD bridge 74 may be disposed on the insulating layer 150 to electrically connect the end portions of the ESD line 70 to each other through the ESD contact 90 formed through the insulating layer 150.

As illustrated in FIG. 7, the ESD bridge 74 may extend to avoid or not to overlap the antenna unit 50 or the antenna pads 56 and 58 in a planar view. For example, the ESD bridge 74 may have a zigzag line shape including a bent portion or a wavy line shape.

Figure 8:
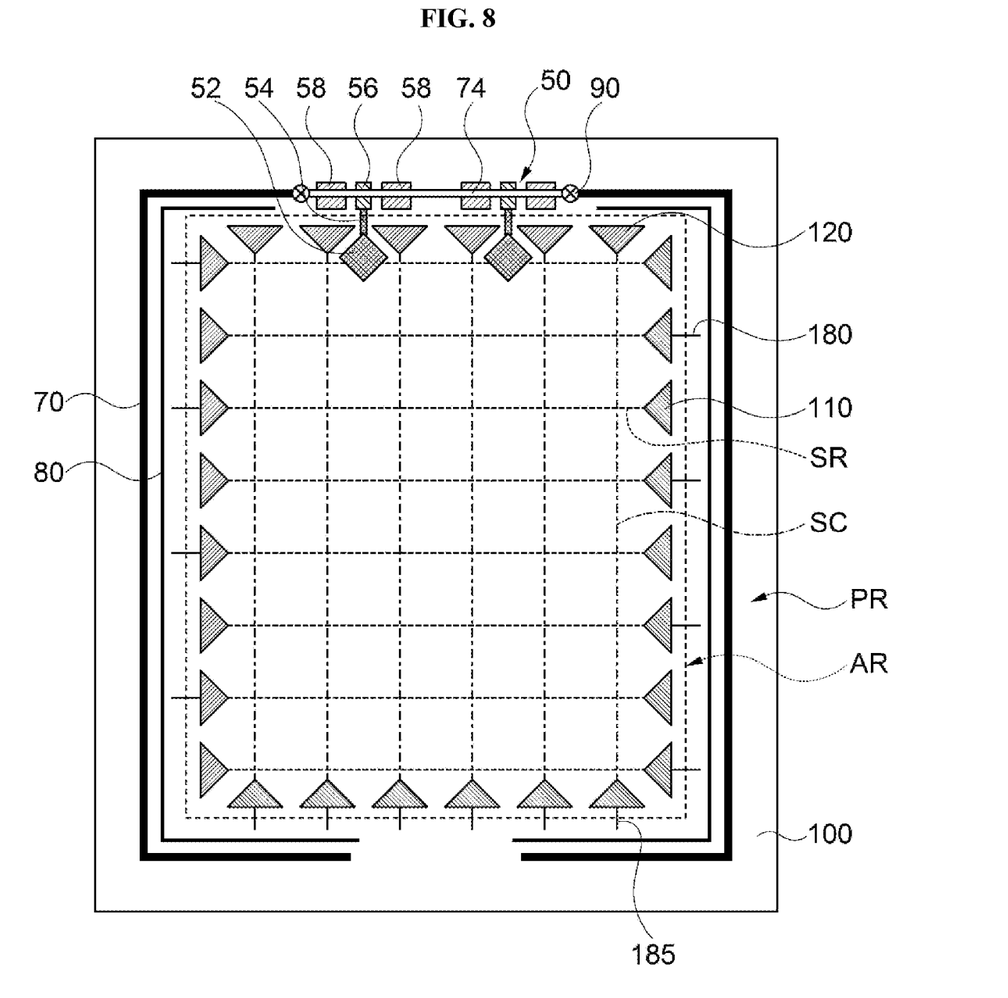

Referring to FIG. 8, the ESD bridge 74 may extend to cross over the antenna unit 50 or the antenna pads 56 and 58 on the insulating layer 150. In this case, a length of the ESD structure may be decreased, thereby increasing a static electricity discharge rate around the antenna unit 50.

Figure 9:
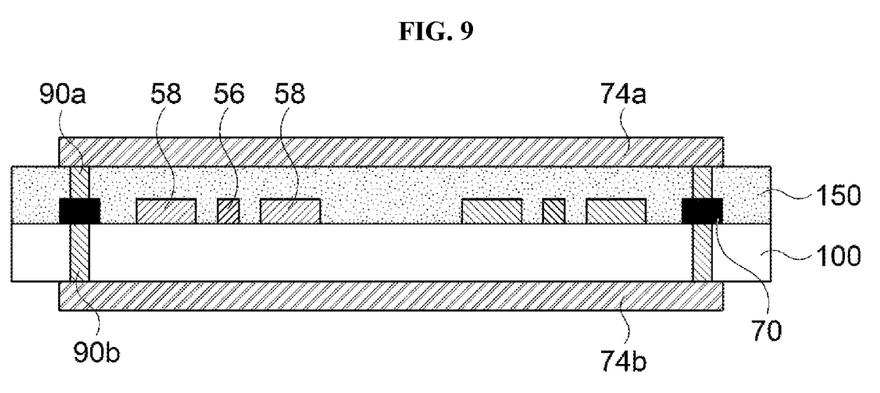
FIG. 9 is a schematic cross-sectional view illustrating an antenna-inserted electrode structure in accordance with some exemplary embodiments.

FIG. 9 is a schematic cross-sectional view illustrating an antenna-inserted electrode structure in accordance with some exemplary embodiments.

Referring to FIG. 9, the ESD bridge may be disposed at upper and lower levels of the antenna unit 50.

In some embodiments, a first ESD bridge 74a may be connected to the ESD lines 70 via a first ESD contact 90a penetrating the insulating layer 150, and a second ESD bridge 74b may be disposed on, e.g., a bottom surface of the substrate layer 100.

For example, the second ESD bridge 74b may be connected to the ESD lines 70 via a second ESD contact 90b penetrating through the substrate layer 100.

The second ESD bridge 74b may be added, so that a side current caused by the external static electricity may also be distributed through a layer below the antenna unit 50.

Figure 10:
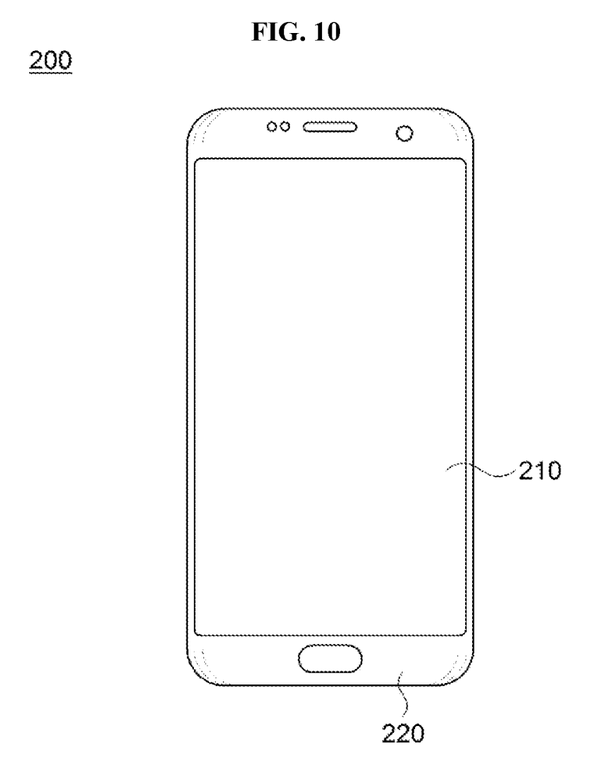
FIG. 10 is a schematic top planar view illustrating an image display device in accordance with exemplary embodiments.

FIG. 10 is a schematic top planar view illustrating an image display device in accordance with exemplary embodiments. For example, FIG. 10 illustrates an outer shape including a window of the image display device.

Referring to FIG. 10, an image display device 200 may include a display area 210 and a peripheral area 220. The peripheral area 220 may be disposed at both lateral and/or end portions of the display area 210. The peripheral area 220 may correspond to, e.g., a light-shielding portion or a bezel portion of the image display device.

The sensing electrodes 110 and 120 and the radiator 52 of the antenna-inserted electrode structure as described with reference to FIG. 1 may be arranged in the display area 210.

In an embodiment, the radiator 52 and/or the sensing electrodes 110 and 120 may include a mesh structure formed of a low-resistance metal or alloy, and may be prevented from being viewed by a user.

The above-described antenna bonding region and touch sensor circuit connection region CR may be included in the peripheral area 220. Accordingly, an electrical connection with the antenna driving IC chip and the touch sensor driving IC chip in the peripheral area 220 may be implemented through the above-described pads.

The ESD structure and the guard line 80 according to exemplary embodiments may be arranged along a boundary of the peripheral region 220 to effectively remove external static electricity and signal noise.

What is claimed is:

1. An antenna-inserted electrode structure, comprising:
   a substrate layer including an active region and a peripheral region at an outside the active region;
   an antenna unit disposed on the substrate layer;
   sensing electrodes arranged on the active region of the substrate layer;
   an electrostatic discharge line extending from a periphery of the antenna unit on the substrate layer;
   a guard line extending on the peripheral region of the substrate layer;
   traces branching from the sensing electrodes and extending on the peripheral region;
   a sensing pad row comprising sensing pads connected to end portions of the traces; and
   an electrostatic discharge pad connected to an end portion of the electrostatic discharge line; and
   a guard pad connected to an end portion of the guard line.

2. The antenna-inserted electrode structure of claim 1, wherein the antenna unit comprises a plurality of antenna units spaced apart from each other on the substrate layer, and the electrostatic discharge line comprises a plurality of electrostatic discharge lines extending from peripheries of outermost antenna units of the plurality of antenna units.

3. The antenna-inserted electrode structure of claim 2, further comprising an electrostatic discharge pattern disposed between antenna units neighboring each other of the plurality of antenna units.

4. The antenna-inserted electrode structure of claim 3, further comprising an electrostatic discharge bridge electrically connecting the electrostatic discharge pattern and the electrostatic discharge line.

5. The antenna-inserted electrode structure of claim 2, further comprising an electrostatic discharge bridge electrically connecting the plurality of electrostatic discharge lines.

6. The antenna-inserted electrode structure of claim 5, wherein the electrostatic discharge bridge extends to avoid the plurality of antenna units in a planar view.

7. The antenna-inserted electrode structure of claim 5, wherein the electrostatic discharge bridge extends across the plurality of antenna units in a planar view.

8. The antenna-inserted electrode structure of claim 5, further comprising:

an insulating layer covering the plurality antenna units on the substrate layer; and electrostatic discharge contacts formed through the insulating layer to connect the plurality of electrostatic discharge lines and the electrostatic discharge bridge to each other.

9. The antenna-inserted electrode structure of claim 8, wherein the electrostatic discharge bridge comprises a first electrostatic discharge bridge disposed on the insulating layer, and a second electrostatic discharge bridge disposed under the substrate layer, wherein the electrostatic discharge contacts comprise a first electrostatic discharge contact penetrating the insulating layer to be connected to the first electrostatic discharge bridge, and a second electrostatic discharge contact penetrating the substrate layer to be connected to the second electrostatic discharge bridge.

10. The antenna-inserted electrode structure of claim 1, wherein the electrostatic discharge line extends on the peripheral region along a periphery of the active region.

11. The antenna-inserted electrode structure of claim 10, wherein the guard line is electrically separated from the electrostatic discharge line and is closer to the active region than the electrostatic discharge line.

12. The antenna-inserted electrode structure of claim 1, wherein the guard pad is disposed between the sensing pad row and the electrostatic discharge pad.

13. An image display device comprising the antenna-inserted electrode structure of claim 1.

* * * * *